United States Patent [19]

Leboeuf

[11] Patent Number: 5,656,717
[45] Date of Patent: Aug. 12, 1997

[54] HIGH PRESSURE PROCESS FOR THE MANUFACTURE OF TEREPHTHALIC ACID COPOLYAMIDES

[75] Inventor: Christian Leboeuf, Kingston, Canada

[73] Assignee: Du Pont Canada Inc., Mississauga, Canada

[21] Appl. No.: 257,509

[22] Filed: Jun. 8, 1994

[51] Int. Cl.$^6$ .................................... C08G 69/28
[52] U.S. Cl. .................. 528/349; 528/335; 528/338; 528/339; 528/340; 528/347
[58] Field of Search ..................... 528/349, 335, 528/338, 339, 340, 347

[56] References Cited

U.S. PATENT DOCUMENTS

| | | | |
|---|---|---|---|
| 4,163,101 | 7/1979 | Schade et al. | 528/347 |
| 4,219,636 | 8/1980 | Nielinger et al. | 528/336 |
| 5,109,106 | 4/1992 | Lahary et al. | 528/347 |
| 5,194,578 | 3/1993 | Anton | 528/349 |
| 5,270,437 | 12/1993 | Marks | 528/336 |
| 5,302,691 | 4/1994 | Soelch | 528/349 |

FOREIGN PATENT DOCUMENTS

WO9210525  6/1992  WIPO .

Primary Examiner—James J. Seidleck
Assistant Examiner—P. Hampton-Hightower

[57] ABSTRACT

A process for the copolymerization of (1) a carboxylic acid comprising terephthalic acid and mixtures thereof with isophthalic acid with (2) a mixture of hexamethylene diamine and 2-methyl pentamethylene diamine. The pressure in the polymerization process is maintained at at least about 2.15 MPa for a period of at least about 40 minutes so that the resultant copolyamide, when annealed, has less than 1% by weight based on the total weight of the copolyamide of fractions having melting points greater than 320° C. Use of lower pressures and times tends to result in formation of a high melting fraction.

14 Claims, No Drawings

HIGH PRESSURE PROCESS FOR THE MANUFACTURE OF TEREPHTHALIC ACID COPOLYAMIDES

BACKGROUND OF THE INVENTION

The present invention relates to a process for the manufacture of copolyamides of terephthalic acid, and especially to the manufacture of such copolyamides without formation of a high melting fraction by using a high pressure polymerization process.

As used herein, a "single step" polymerization process is a polymerization process in which monomers are subjected to a polymerization cycle in a reactor that concludes with the pressure being returned to substantially atmospheric pressure. It is understood that the copolyamide obtained from such a process may be subjected to further processing, including finishing and extrusion, before or after pelletization.

Single-step polymerization processes have the advantage that polymer is manufactured in a single step, as opposed to two step or multi-step processes, thereby reducing handling of the partially formed polymer during the intermediate stages of the process. However, in the manufacture of copolyamides of terephthalic acid, especially copolyamides of terephthalic acid, hexamethylene diamine and 2-methyl pentamethylene diamine, using a single step polymerization process, it has been found that a high melting fraction is formed.

The high melting fraction, with a melting point in excess of 320° C. and especially approximately 334° C., is usually not noticed in the first batch of polymer produced in an autoclave, but becomes apparent in subsequent batches made in the same autoclave unless steps are taken to carefully clean-out the autoclave between consecutive batches. As the polymer would normally be subsequently processed at melt temperatures of less than 320° C., the high melting fraction manifests itself as unmelted or gel-like portions of polymer, which are commercially unacceptable; the gel-like portions are believed to be essentially comprised of a high melting crystalline phase, which is soluble in sulphuric acid, and not gel per se which would not be soluble in sulphuric acid.

It has now been found that copolymers of terephthalic acid, optionally including isophthalic acid, and mixtures of hexamethylene diamine and 2-methyl pentamethylene diamine, may be manufactured without the formation of a high melting fraction in significant amounts.

SUMMARY OF THE INVENTION

Accordingly, the present invention provides a process for the preparation of a copolyamide, especially partially crystalline copolyamide, comprising the polymerization stages of:

(a) feeding to a reactor an aqueous salt solution of an admixture of aromatic carboxylic acid and aliphatic diamine, said aromatic carboxylic acid being selected from terephthalic acid and mixtures of terephthalic acid and isophthalic acid and said aliphatic diamine being a mixture of hexamethylene diamine and 2-methyl pentamethylene diamine;

(b) heating the aqueous salt solution under a pressure of at least about 2.15 MPa for a period of at least about 40 minutes, especially at least 60 minutes, and venting water and other volatile matter from the reactor;

(c) reducing the pressure in the reactor to atmospheric pressure;

(d) controlling stages (b) and (c) so as to avoid excessive foaming of the admixture in the reactor; and (e) discharging the copolyamide so obtained from the reactor.

DETAILED DESCRIPTION OF PREFERRED EMBODIMENTS

In a preferred embodiment of the process of the invention, stage (c) additionally includes maintaining the admixture in the reactor under a vacuum.

In another embodiment, the pressure in stage (b) is at least 2.28 MPa.

In a further embodiment, the time in stage (b) is at least 90 minutes.

The present invention further provides in a process for the preparation of multiple consecutive batches of a copolyamide, especially partially crystalline copolyamide, of terephthalic acid and hexamethylene diamine in a reactor without clean-out of the reactor, in which the copolyamide obtained from such process contains more than about 2% by weight of a fraction with an annealed melting point of greater than 320° C., said process comprising the stages of:

(a) feeding to a reactor an aqueous salt solution of an admixture of aromatic carboxylic acid and aliphatic diamine, said aromatic carboxylic acid being selected from terephthalic acid and mixtures of terephthalic acid and isophthalic acid and said aliphatic diamine being a mixture of hexamethylene diamine and 2-methyl pentamethylene diamine;

(b) heating the aqueous salt solution under pressure and venting water and other volatile matter from the reactor;

(c) reducing the pressure in the reactor to atmospheric pressure;

(d) controlling stages (b) and (c) so as to avoid excessive foaming of the admixture in the reactor; and (e) discharging the copolyamide so obtained from the reactor;

the improvement comprising maintaining the pressure in stage (b) at at least about 2.15 MPa.

In a preferred embodiment, the pressure of at least about 2.15 MPa is maintained in stage (b) for a period of at least about 40 minutes, especially at least 60 minutes.

In preferred embodiments of the processes of the invention, the stages of the process are controlled so that the copolyamide produced has an inherent viscosity of at least 0.6 dL/g, especially at least 0.8 dL/g.

As used herein, "clean-out" of a reactor means steps taken to clean or remove high molecular weight polyamide, degradation or gel products and other matter that is not discharged from the reactor under normal processing conditions.

The present invention relates to the manufacture of partially crystalline copolyamides formed from an aromatic carboxylic acid and a mixture of hexamethylene diamine and 2-methyl pentamethylene diamine. The aromatic carboxylic acid is terephthalic acid or a mixture of terephthalic acid and isophthalic acid.

The amounts of acid and diamines should be substantially complementary on a molar basis, as will be appreciated by persons skilled in the art. An excess of acids or diamines, especially the latter, may be used depending on the desired characteristics of the copolyamide and the nature and extent of side reactions that may produce volatile or other matter; as noted below, diamines tend to be more volatile than acids. A broad range of ratios of amounts of terephthalic acid, isophthalic acid, hexamethylene diamine and 2-methyl pentamethylene diamine may be used in the process. In preferred embodiments, the ratio of hexamethylene diamine to 2-methyl pentamethylene diamine is in the range 40:60 to 60:40, and especially about 50:50, with the acid being terephthalic acid. In other embodiments, the amount of isophthalic acid is selected to be at least 27.5%, molar basis, especially at least 30%, of the total amount of acid and diamine monomers.

The copolyamides produced by the process of the present invention are generally partially crystalline polymers, rather than an amorphous polymer. In embodiments, the polymers have a heat of fusion of greater than 17 J/g. Crystallinity may be determined using a differential scanning calorimeter.

The copolyamide is prepared in a polymerization process in which an aqueous salt solution of the aromatic carboxylic acids, hexamethylene diamine and 2-methyl pentamethylene diamine is fed to a reactor. The molar amount of aromatic acid is substantially complementary to the total molar amount of the diamines, as discussed above. As is known, diamines tend to be more volatile than carboxylic acids and thus it may be desirable to feed an excess of diamine to the reactor. Catalysts may also be used e.g. phosphinic acid and/or the sodium or potassium salts thereof, phosphorus acid, hypophosphorous acid, sodium hypophosphite, phosphoric acid and the like; typical amounts of catalysts are 0.02–1.00% by weight, especially 0.025–0.20% by weight.

In the process, the aqueous salt solution is heated in a reactor (autoclave) under pressure. The process of the present invention requires that the pressure be maintained at at least about 2.15 MPa, although the pressure may also be maintained at a lower pressure for a period of time, especially prior to maintaining at the pressure of at least 2.15 MPa. In preferred embodiments, the pressure is maintained at at least about 2.22 MPa and preferably at least about 2.28 MPa. In addition, the pressure is preferably maintained at such values for at least 60 minutes, especially at least 90 minutes and in particular embodiments for at least 120 minutes. Water and other volatile matter, which may include diamine, is vented from the reactor. The temperature of the admixture in the reactor will normally exceed at least 275° C., and especially be in the range of 300°–315° C.

The pressure in the reactor is then reduced to atmospheric pressure, especially over a period of at least 15 minutes, particularly over a period of 20 to 90 minutes. The pressure should be reduced in a manner that minimizes or avoids excessive foaming of the reaction mixture in the reactor. Anti-foam agents may be added to reduce the amount of foaming. The reaction mixture is then maintained at about atmospheric pressure or under a vacuum until the copolyamide has reached a predetermined molecular weight. The copolyamide thus obtained is discharged from the reactor. It should be understood, however, that the copolyamides may be manufactured using continuous polymerization techniques and/or subjected to solid phase polymerization or other further processing stages.

As is illustrated herein, the use of a polymerization process such as that described above will often result in the formation of a high melting fraction of copolyamide, with a melting point after annealing of greater than about 320° C., and especially in the range of about 335°–340° C., unless the pressure and time are maintained within the limits given above. It is to be understood however, that certain ratios of monomer compositions will result in copolyamides that do not contain the high melting fraction, as discussed in the aforementioned application of R. R. Soelch. The high melting fraction will normally not be apparent in the first batch of copolyamide formed in an autoclave i.e. the first batch formed after the autoclave has been thoroughly cleaned. The high melting fraction will normally appear, if it is going to appear, in the second or third batches of copolyamide formed in the autoclave. It is not practical or economic to clean out an autoclave after each and every batch of copolyamide has been produced.

In order to prevent formation of the high melting fraction, or to at least reduce the amount of high melting fraction to less than 2% by weight, and especially less than 0.05% by weight, the pressure during reaction is maintained at at least about 2.15 MPa, especially at least 2.28 MPa, for at least about 40 minutes, preferably for a period of 40 to 120 minutes. The effects of use of lower pressures or shorter times is illustrated in the examples. The copolyamides of the invention may be blended with stabilizers, flame retardants, smoke depressants, plasticizers, conductive and/or antistatic agents, lubricants and mould release agents, nucleating agents, dyes and pigments, fillers including glass fibres, minerals, toughening and other modifying agents, and other additives that may be used in polyamide compositions. Examples of heat stabilizers include copper(I) halides e.g. bromide and iodide, and alkali halides e.g. lithium, sodium and potassium bromides and iodides, which may be used with or without phosphorus compounds. Examples of the latter are phosphites, phosphines, phosphates and alkali metal salts of phosphorus acids e.g. sodium phenyl phosphinate, sodium hypophosphite, triaryl- and tris (alkylaryl) phosphines e.g. tri-n-butyl phosphine, phenyl dimethyl phosphine and triphenyl phosphine. The organic heat stabilizers include hindered phenols and hindered amines, as well as UV stabilizers and phenolic metal deactivators. Nucleating agents include talc, calcium fluoride and salts of phosphorus acids, for example sodium phenyl phosphinate.

A wide range of fillers may be used e.g. in amounts of 0.5–200 parts of filler per 100 parts of copolyamide. Examples of such fillers include, but are not limited to, silica, metasilicates, alumina, talc, diatomaceous earth, clay, kaolin, quartz, glass, mica, titanium dioxide, molybdenum disulphide, gypsum, iron oxide, zinc oxide, fibres e.g. glass, carbon, boron, aromatic and ceramic fibres, powdered polytetrafluoroethylene and the like.

The copolyamides may be used in the manufacture of products using melt processing techniques, especially products intended for use at temperatures that are higher than those typically used with other polyamides. For example, the copolyamides may be formed into articles using injection moulding technology e.g. into valves, tanks, containers, washers and the like for automotive end-uses, into articles for electrical end-uses e.g. parts requiring resistance to temperatures of 260° C. or above, and articles where retention of mechanical properties under the influence of heat, moisture, hydrocarbons, alcohols including so-called gasohol, and the like are important. Alternatively, the polymers may be spun into fibres e.g. for sewing or industrial threads for end-uses where low shrinkage and elongation are important and/or retention of properties under the influence of moisture, hydrocarbons, alcohols and the like is important. The copolyamides may also be formed into film and sheet. Barrier properties of the copolyamides to water and oxygen may also find uses. The copolyamides may be particularly useful for end-uses where retention of properties at elevated temperatures is required, including as retortable containers.

In embodiments of the invention, the copolyamide is in the form of a fibre, or filament. The fibre preferably has a tenacity of at least 1.5 g/denier and a modulus of at least 30 g/denier.

The present invention is illustrated by the following examples.

EXAMPLE I

A series of runs were carried out in a 12 L reaction vessel. The procedures used are illustrated by the following:

Procedure A, as used in Run 1D:

The 12 L reaction vessel, equipped with a helical ribbon agitator, was charged with 2659 g (16.02 moles) of terephthalic acid, 976 g (8.41 moles) of 2-methyl pentamethylene diamine, 1268.4 g of 74.74% (weight basis) of aqueous hexamethylene diamine solution (8.17 moles), 3.94 g of 25% (weight basis) of aqueous sodium hypophosphite solution, 6 ml of 10% (weight basis) Carbowax® 3350 polyethylene glycol in water and 1200 g of demineralized water.

With the agitator rotating at 50 rpm, the mixture was heated to 130° C., vented to remove entrained oxygen and then heated to 225° C. With the reaction pressure maintained at 1.70 MPa, volatile matter was released over a period of 88 minutes, during which period of time the temperature of the reaction mixture rose to 300° C. The pressure in the reaction mixture was then reduced to atmospheric pressure over a period of 60 minutes, the temperature in the reaction mixture rising to 318° C. The rate of agitation was reduced to 5 rpm. The reaction mixture was maintained under a vacuum of 40 kPa for 15 minutes and then the polymer obtained was discharged from the reactor and quenched in a water bath.

The polymer obtained had an inherent viscosity (IV) of 0.90 dL/g; inherent viscosity was measured on a 5.0 g/L solution in m-cresol. The polymer had a single melting point of 302.4° C., as measured by differential scanning calorimetry (DSC). The polymer obtained in this example, which is a comparative example, exhibited visually the presence of a higher melting fraction, when the polymer was extruded in the form of a strand, but the high melt fraction was less than the detection limit in DSC i.e. it was less than about 0.5% by weight.

Procedure B, as used in Run 2C

The 12 L reaction vessel was charged with 2322 g (14.00 moles) of terephthalic acid, 892 g (7.69 moles) of 2-methyl pentamethylene diamine, 1162.9 g of 72.58% (weight basis) of aqueous hexamethylene diamine solution (7.28 moles), 3.94 g of 25% (weight basis) of aqueous sodium hypophosphite solution, 6 ml of 10% (weight basis) Carbowax® 3350 polyethylene glycol in water, 1200 g of demineralized water and 500 g of pellets of a polymer of terephthalic acid and a 50:50 mixture of hexamethylene diamine and 2-methyl pentamethylene diamine which contained about 18% by weight of a high melting fraction; this polymer was added to simulate an annealed polymer residue and it was the only way this could be achieved in the reaction vessel being used due to equipment limitations.

Copolyamide was produced using the method of Procedure A above, except that the second polymerization cycle, venting at constant pressure, was conducted at a pressure of 2.39 MPa for a period of 66 minutes.

The copolyamide obtained had an IV of 0.81 dL/g and a melting point of 302.6° C. The polymer did not exhibit a high melt fraction when observed visually but it showed a high melt fraction of about 2.8% by weight when tested with DSC.

Table I reports the results of series of runs made using Procedure A or Procedure B above, depending on whether polymer was added to the reaction vessel. Runs 1A–1E are comparative runs and Runs 2A–5D illustrate the invention.

The Runs illustrate, in particular, the effect of pressure in stage (b), the effect of time in stage (b) and the effect of added polymer containing high melt fraction.

TABLE I

| RUN NO. | 1A | 1B | 1C | 1D | 1E |
|---|---|---|---|---|---|
| $P_2$ (MPa) | 1.70 | 1.70 | 1.70 | 1.70 | 1.70 |
| $T_3$ (°C.) | 275 | 275 | 275 | 300 | 300 |
| RESIDUE (g) | 0 | 0 | 0 | 0 | 500 |
| $t_2$ (min) | 60 | 60 | 120 | 120 | 60 |
| IV (dL/g) | 0.80 | 0.81 | 0.63 | 0.90 | 0.79 |
| 3MP (eq/MMg) | 56 | 56 | 74 | 66 | 64 |
| HIGH MELT, (%, DSC) | <0.5 | <0.5 | 1.8 | <0.5 | 15.1 |
| HIGH MELT (VISUAL) | NO | NO | YES | YES | YES |
| % OUT | 86 | 80 | 53 | 80 | 15 |

| RUN NO. | 2A | 2B | 2C | 2D | 2E | 2F |
|---|---|---|---|---|---|---|
| $P_2$ (MPa) | 2.39 | 2.39 | 2.39 | 2.39 | 2.39 | 2.39 |
| $T_3$ (°C.) | 300 | 300 | 300 | 300 | 300 | 300 |
| RESIDUE (g) | 0 | 0 | 500 | 500 | 1000 | 1000 |
| $t_2$ (min) | 60 | 120 | 60 | 120 | 60 | 120 |
| IV (dL/g) | 0.83 | 0.81 | 0.81 | 0.78 | 0.80 | 0.63 |
| 3MP (eq/MMg) | 83 | 110 | 94 | 104 | 90 | 108 |
| HIGH MELT (%, DSC) | <0.5 | <0.5 | 2.8 | 4.5 | 7.0 | 13.0 |
| HIGH MELT (VISUAL) | NO | NO | NO | NO | NO | NO |
| % OUT | 85 | 86 | 62 | 39 | 43 | 41 |

| RUN NO. | 3A | 3B | 3C | 3D |
|---|---|---|---|---|
| $P_2$ (MPa) | 2.49 | 2.49 | 2.49 | 2.49 |
| $T_3$ (°C.) | 300 | 300 | 300 | 300 |
| RESIDUE (g) | 0 | 0 | 1000 | 1000 |
| $t_2$ (min) | 60 | 120 | 60 | 120 |
| IV (dL/g) | 0.74 | 0.70 | 0.69 | 0.62 |
| 3MP (eq/MMg) | 109 | 116 | 113 | 116 |
| HIGH MELT (%, DSC) | <0.5 | <0.5 | <0.5 | 4.3 |
| HIGH MELT (VISUAL) | NO | NO | NO | NO |
| % OUT | 85 | 87 | 88 | 63 |

| RUN NO. | 4A | 4B | 4C | 4D | 4E | 4F |
|---|---|---|---|---|---|---|
| $P_2$ (MPa) | 2.63 | 2.63 | 2.63 | 2.63 | 2.63 | 2.63 |
| $T_3$ (°C.) | 300 | 300 | 300 | 300 | 300 | 300 |
| RESIDUE (g) | 0 | 0 | 500 | 500 | 1000 | 1000 |
| $t_2$ (min) | 60 | 120 | 60 | 120 | 60 | 120 |
| IV (dL/g) | 0.74 | 0.70 | 0.53 | 0.68 | 0.69 | 0.69 |
| 3MP (eq/MMg) | 121 | 134 | 112 | 128 | 107 | 114 |
| HIGH MELT (%, DSC) | <0.5 | <0.5 | 1.5 | 1.9 | 2.6 | 5.8 |
| HIGH MELT (VISUAL) | NO | NO | NO | NO | NO | NO |
| % OUT | 85 | 90 | 74 | 76 | 80 | 53 |

| RUN NO. | 5A | 5B | 5C | 5D |
|---|---|---|---|---|
| $P_2$ (MPa) | 3.07 | 3.07 | 3.07 | 3.07 |
| $T_3$ (°C.) | 300 | 300 | 300 | 300 |
| RESIDUE (g) | 0 | 0 | 1000 | 1000 |
| $t_2$ (min) | 120 | 120 | 120 | 120 |
| IV (dL/g) | 0.57 | 0.55 | 0.54 | 0.52 |
| 3MP (eq/MMg) | 174 | 190 | 176 | 186 |
| HIGH MELT (%, DSC) | <0.5 | <0.5 | 2.9 | 4.5 |
| HIGH MELT (VISUAL) | NO | NO | NO | NO |
| % OUT | 85 | 89 | 81 | 82 |

Note:
"$P_2$" is the pressure in stage (b);
"$T_3$" is the temperature at the start of stage (c);
"Residue" is the amount of polymer containing high melt fraction added to the reaction vessel;
"$t_2$" is the time in stage (b);
"IV" is inherent viscosity measured on a 5.0 g/L solution in m-cresol;
"3MP" is the amount of cyclic amine produced in the process, referred to as the amount of 3-methyl piperidine;
"High Melt % DSC" is the amount of high melting fraction as determined by differential scanning calorimetry;
"High Melt Visual" indicates whether the high melt fraction was visible in an extruded strand of polymer;
"% Out" is the amount of polymer cast from the reaction vessel, expressed as a percentage of the stoichiometric amount.

The results show that the high melt fraction was visible in the polymer when the pressure in stage (b) was low i.e. Runs 1A–1E. The Runs at higher pressure did not exhibit visual high melting fraction even when polymer containing high melt fraction had been added to the reaction vessel.

Increasing the period of time in stage (b) from 60 minutes to 120 minutes had an adverse affect on the amount of high melt fraction as determined by DSC.

The addition of polymer containing high melt fraction to the reaction vessel, to simulate presence of polymer with high melt fraction remaining in the vessel from a previous run, adversely affected the amount of polymer cast from the reaction vessel, especially with the higher viscosity polymers.

The melting point of the high melt fraction is in excess of the temperatures reached during the polymerization process. Thus, it is to be expected that the high melt fraction added in the form of pellets containing that fraction would not be destroyed during the polymerization process. Moreover, it might be anticipated that the presence of the crystalline high melt fraction would induce crystallization of additional polymer into the crystalline form of the high melt fraction. Consequently, it would be expected that presence of high melt fraction in the reactor prior to polymerization would result in an increase in that fraction in the polymer obtained.

This example shows that use of the high pressure resulted in a lower increase in high melt fraction, and in some instances a decrease in the amount, compared with the higher amounts obtained when the lower pressure was used. This has significant benefits in the operation of the polymerization process to produce multiple consecutive batches of polymer of commercially-acceptable quality without cleanout of the reactor or autoclave.

EXAMPLE II

An aqueous salt solution formed from terephthalic acid, hexamethylene diamine and 2-methyl pentamethylene diamine (1112.32 kg, 44.8% salt with a 5.2% molar excess of hexamethylene diamine and 13% molar excess of 2-methyl pentamethylene diamine) was charged to an autoclave. The solution was heated in the autoclave, with venting of water at a constant pressure of 340 kPa until the salt in the autoclave reached a temperature of 162° C. Venting was then interrupted. The temperature of the autoclave was increased, with gases being vented at a pressure of 2.15 MPa; the autoclave was maintained at this pressure for approximately two hours, until the temperature of the melt had reached 300° C. A pressure reduction cycle was then initiated, to atmospheric pressure over a period of about 60 minutes. During this stage, the melt reached 318° C. The molten polymer was then subjected to a vacuum of 80 kPa for 17 minutes, the melt temperature increasing to 330° C.

The polymer thus obtained was discharged from the autoclave through a multiple hole die, quenched in cold water and pelletized. The yield of pelletized polymer was 88.2%.

The polymer obtained had an inherent viscosity (IV) of 0.87 dL/g, as measured on a 5.0 g/L solution of polymer in m-cresol. The polymer had a single melting point of 302° C. (DSC). The polymer did not show any visual evidence of high melt fraction, and none (<0.5%) was detected by DSC. The amount of cyclic amine (3-MP) was 88 eq/MMg of polymer.

EXAMPLE III

The procedure of Example II was repeated using lower pressures and temperatures.

The aqueous salt solution was charged to an autoclave and heated with venting of water at a constant pressure of 240 kPa until the salt in the autoclave reached a temperature of 145° C. Venting was then interrupted. The temperature of the autoclave was increased, with gases being vented at a pressure of 1.70 MPa; the autoclave was maintained at this pressure for approximately two hours, until the temperature of the melt had reached 295° C. The pressure reduction cycle was then initiated, to atmospheric pressure over a period of about 60 minutes. During this stage, the melt reached 312° C. The molten polymer was then subjected to a vacuum of 80 kPa for 10 minutes, the melt temperature increasing to 318° C.

The polymer thus obtained was discharged from the autoclave through a multiple hole die, quenched in cold water and pelletized. However, discharging of the polymer from the autoclave lasted for only a short period of time and the yield of pelletized polymer was only 66.5%.

The polymer obtained had an inherent viscosity (IV) of 0.81 dL/g, as measured on a 5.0 g/L solution of polymer in m-cresol. The polymer had a single melting point of 302° C. (DSC). The polymer showed visual evidence of high melt fraction; the amount detected using DSC was approximately 4.5%. The amount of cyclic amine (3-MP) was 74 eq/MMg of polymer.

EXAMPLE IV

An aqueous salt solution formed from terephthalic acid, hexamethylene diamine and 2-methyl pentamethylene diamine (2540 kg, 50% salt with a 5.4% molar excess of hexamethylene diamine and 7.4% molar excess of 2-methyl pentamethylene diamine) was charged to an autoclave. The solution was heated in the autoclave, with venting of water at a constant pressure of 340 kPa until the salt in the autoclave reached a temperature of 162° C. Venting was then interrupted. The temperature of the autoclave was increased, with gases being vented at a pressure of 2.15 MPa; the autoclave was maintained at this pressure for approximately two hours, until the temperature of the melt had reached 300° C. A pressure reduction cycle was then initiated, to atmospheric pressure over a period of about 40 minutes. During this stage, the melt reached 323° C. The molten polymer was then subjected to a vacuum of 80 kPa for 4 minutes, the melt temperature increasing to 325° C.

The polymer thus obtained was discharged from the autoclave through a multiple hole die, quenched in cold water and pelletized. The yield of pelletized polymer was 77%.

The polymer obtained had an inherent viscosity (IV) of 0.84 dL/g, as measured on a 5.0 g/L solution of polymer in m-cresol. The polymer had a single melting point of 302° C. (DSC). The polymer did not show any visual evidence of high melt fraction; the amount detected by DSC was approximately 1.4% by weight. The amount of cyclic amine (3-MP) was 86 eq/MMg of polymer.

I claim:

1. A process for the preparation of a copolyamide, comprising the polymerization stages of:
   (a) feeding to a reactor an aqueous salt solution of an admixture of terephthalic acid and aliphatic diamine, said aliphatic diamine being a mixture of hexamethylene diamine and 2-methyl pentamethylene diamine;
   (b) heating the aqueous salt solution under a pressure of at least 2.15 MPa and a temperature of at least about 275° C. and maintaining that pressure for a period of at least 40 minutes, while venting water and other volatile matter from the reactor;

(c) reducing the pressure in the reactor to atmospheric pressure;

(d) controlling stages of (b) and (c) so as to avoid excessive foaming of the admixture in the reactor; and (e) discharging the copolyamide so obtained from the reactor.

2. The process of claim 1 in which the time in stage (b) is at least about 60 minutes.

3. The process of claim 2 in which stage (c) additionally includes maintaining the admixture in the reactor under a vacuum.

4. The process of claim 2 in which the pressure in stage (b) is at least about 2.28 MPa.

5. The process of claim 4 in which the time in stage (b) is at least 90 minutes.

6. The process of claim 1 in which the stages of the process are controlled so that the copolyamide produced has an inherent viscosity of at least about 0.6 dL/g.

7. The process of claim 6 in which the stages of the process are controlled so that the copolyamide produced has an inherent viscosity of at least about 0.8 dL/g.

8. A process for the preparation of multiple consecutive batches of a copolyamide of terephthalic acid and an aliphatic diamine in a reactor without clean-out of the reactor, in which the copolyamide obtained from such process contains more than about 2% by weight of a fraction with an annealed melting point of greater than 120° C., said process comprising the stages of:

(a) feeding to a reactor the aqueous salt solution of an admixture of terephthalic acid and aliphatic diamine, said aliphatic diamine being a mixture of hexamethylene diamine and 2-methyl pentamethylene diamine;

b) heating the aqueous salt solution under pressure and venting water and other volatile matter from the reactor;

(c) reducing the pressure in the reactor to atmospheric pressure;

(d) controlling stages (b) and (c) so as to avoid excessive foaming of the admixture in the reactor; and (e) discharging the copolyamide from the reactor;

the improvement comprising maintaining the pressure in stage (b) of at least 2.15 MPa and a temperature of at least about 275° C.

9. The process of claim 8 in which the pressure of at least 2.15 MPa is maintained in stage (b) for a period of at least about 40 minutes.

10. The process of claim 9 in which the pressure is maintained in stage (b) for at least about 60 minutes.

11. The process of claim 10 in which the stages of the process are controlled so that the copolyamide produced has an inherent viscosity of at least about 0.6 dL/g.

12. The process of claim 11 in which the stages of the process are controlled so that the copolyamide produced has an inherent viscosity of at least about 0.8 dL/g.

13. The process of claim 1 in which the copolyamide is a partially crystalline copolyamide.

14. The process of claim 8 in which the copolyamide is a partially crystalline copolyamide.

* * * * *